United States Patent Office 3,829,436
Patented Aug. 13, 1974

---

3,829,436
3-[(AMINO)-PHENYL]INDOLINE COMPOUNDS AND PROCESS FOR MANUFACTURING THE SAME
James J. Krutak, Sr., Kingsport, Tenn., assignor to Eastman Kodak Company, Rochester, N.Y.
No Drawing. Filed June 20, 1972, Ser. No. 264,688
Int. Cl. C07d 27/38
U.S. Cl. 260—326.11        8 Claims

ABSTRACT OF THE DISCLOSURE

Novel 3-[(amino)-phenyl]indoline compounds are prepared by reacting certain aromatic amines with α-haloaldehydes or derivatives thereof. These compounds are useful as intermediates for the preparation of Fischer's bases, cyanine dyes, azo dyes and active color photographic developers.

---

This invention relates to a new class of organic compounds useful as intermediates for the preparation of Fischer's bases, cyanine dyes, azo dyes, and active color photographic developers. More particularly, this invention relates to a new class of substituted 3-[(amino)-phenyl]indolines and a novel process for preparing them.

The new compounds of the present invention may be represented by the following general formula

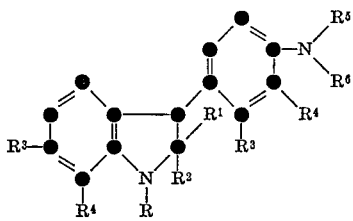

wherein

R represents hydrogen, lower alkyl, phenyl, or lower alkyl substituted with halogen, hydroxy, lower alkanoylamino, lower alkoxy or cyano;

$R^1$ and $R^2$ are the same or different and each represents lower alkyl, phenyl, or phenyl substituted with lower alkyl, halogen, cyano, or $R^1$ and $R^2$ taken collectively with the carbon atom to which they are bonded represent a monocycloalkyl ring of from 5 to 7 carbon atoms or a bicycloalkyl ring of from 7 to 9 carbon atoms;

$R^3$ and $R^4$ are the same or different and each represents hydrogen, lower alkyl, halogen, lower alkoxy, lower alkanoylamino, lower alkoxycarbonyl or lower alkyl substituted with halogen, hydroxy, cyano, lower alkanoylamino, lower alkylsulfonyl or $SO_2F$; and $R^5$ and $R^6$ are the same or different and each represents hydrogen, lower alkyl, phenyl, lower alkyl substituted with cyano, halogen, lower alkoxy, hydroxy, lower alkanoylamino, or phenyl substituted with cyano, halogen, or hydroxy.

Accordingly, it is an object of this invention to provide a class of novel 3-[(amino)phenyl] indoline compounds. It is a further object of this invention to provide a method for preparing these novel indolines in high yields. It is still another object of this invention to provide a class of novel intermediates suitable for use in the production of Fischer's bases, cyanine dyes, azo dyes and active photographic developers. Other objects will appear hereinafter.

According to the process of this invention there is provided a method of preparing substituted 3-[(amino)-phenyl]indolines which comprises the steps of:

admixing one mole proportion of a compound having the formula

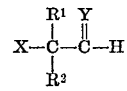

to (A) at least three mole proportions of at least one compound having the formula

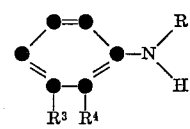

or (B) a mixture of at least one mole proportion of the above amine and at least three mole proportions of at least one tertiary amine having the formula

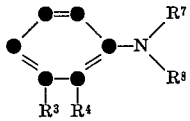

and heating the admixture for at least 30 minutes at a temperature between about 110° and about 150° C., wherein R represents hydrogen, lower alkyl, phenyl, or lower alkyl substituted with halogen, hydroxy, lower alkanoylamino, or cyano;

$R^1$ and $R^2$ are the same or different and each represents lower alkyl, phenyl, or phenyl substituted with lower alkyl, halogen, or cyano, or $R^1$ and $R^2$ taken collectively with the carbon atom to which they are bonded represent a monocycloalkyl ring of from 5 to 7 carbon atoms on a bicycloalkyl group of from 7 to 9 carbon atoms;

$R^3$ and $R^4$ are the same or different and each represents hydrogen, lower alkyl, halogen, lower alkoxy, lower alkanoylamino, lower alkoxycarbonyl, or lower alkyl substituted with halogen, hydroxy, cyano, lower alkanoylamino, lower alkylsulfonyl or $SO_2F$;

$R^7$ and $R^8$ are the same or different and each represents lower alkyl, phenyl, lower alkyl substituted with halogen, lower alkoxy, hydroxy, lower alkanoylamino or cyano; or phenyl substituted with cyano, halogen, or hydroxy; represents chloro, bromo or

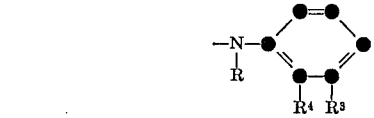

and
Y represents oxygen or

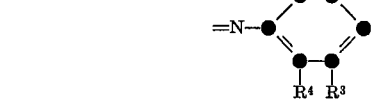

Examples of the lower alkyl groups represented by R and $R^1$ through $R^8$ are methyl, ethyl, propyl, isobutyl, hexyl, etc. As used herein to describe a substituent containing an alkyl moiety, the word "lower" designates a carbon content of up to about six carbon atoms.

Examples of the substituted phenyl groups represented by $R^1$, $R^2$, $R^5$, $R^6$, $R^7$ and $R^8$ are p-tolyl, m-ethylphenyl, p-butylphenyl, p-cyanophenyl, o-bromo-p-tolyl, o,p-dichlorophenyl, etc.

Examples of R¹ and R² when taken collectively with the carbon atoms to which they are bonded represent a monocycloalkyl ring or bicycloalkyl ring are

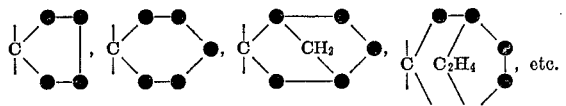

Examples of the groups represented by R³ and R⁴ are chloro, bromo, methoxy, ethoxy, butoxy, propoxy, —NHCOCH₃, —NHCOC₂H₅, —COOCH₃, —COOC₂H₅, 2-chloroethyl, bromomethyl, bromobutyl, hydroxyethyl, hydroxypropyl, ethoxybutyl, butoxyethyl, methoxyethyl, cyanoethyl, cyanobutyl, acetamidoethyl, butyramidoethyl, propionamidomethyl acetamidopropyl, $CH_3SO_2$, $C_2H_5SO_2$, $SO_2F$, etc.

Examples of suitable substituted lower alkyl groups represented by R, and R⁵ through R⁸ are hydroxyethyl, hydroxybutyl, cyanomethyl, cyanoethyl, cyanobutyl, bromomethyl, chloroethyl, bromobutyl, acetamidoethyl, propionamidoethyl, acetamidobutyl, ethoxyethyl, methoxyethyl, etc.

In a preferred embodiment of the invention there is provided the above compounds and process wherein R represents hydrogen, lower alkyl, or phenyl; R¹ and R² represent lower alkyl; R³ and R⁴ represent hydrogen, lower alkyl, halogen, lower alkanoylamino or lower alkoxy; R⁵ and R⁶ represent hydrogen, lower alkyl, phenyl or alkyl substituted with cyano, halogen or lower alkoxy; and R⁷ and R⁸ represent lower alkyl; X represents chloro; and Y represents oxygen.

The aldehydes and aromatic amines useful in this invention are well-known compounds and are either available commercially or are readily prepared by well-known procedures.

The compounds represented by the general formula

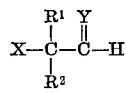

wherein X and Y are represented by

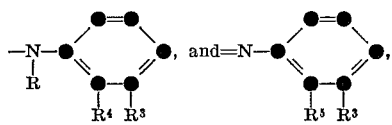

may be prepared according to the following reaction sequence: (α-chloroisobutyraldehyde and aniline are used as representative reactants for the general reaction)

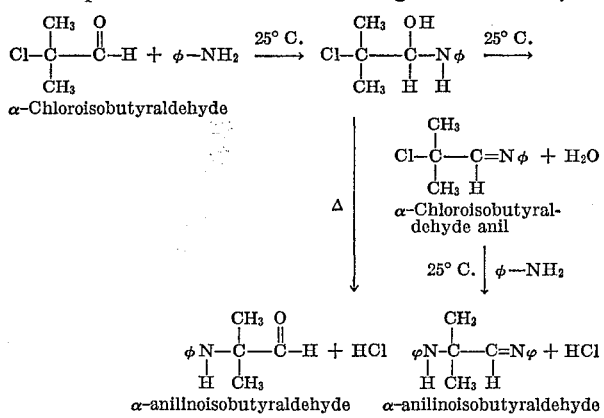

According to one embodiment of the invention a given primary or secondary aromatic amine (at least 3 mole proportions and preferably about 5 mole proportions) may be degassed with N₂ and stirred under an atmosphere of N₂. The aldehyde (1 mole proportion) is added to the aromatic amine (at 25° C. in the case of primary aromatic amines or 100° C. for secondary aromatic amines) and the exothermic reaction is easily controlled or maintained at the reflux temperature (110° to about 150° C., preferably 130° to 140° C., depending upon the amine utilized) at 760 mm. Hg for at least about 30 minutes (preferably about 1 hour). The resultant reaction may be represented by the following equation (α-chloroisobutyraldehyde and aniline are used as representative examples for the general reaction):

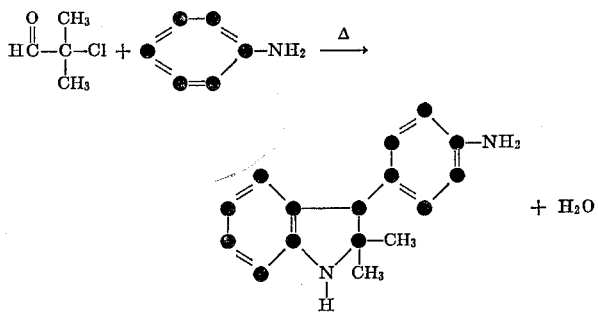

One mole of water is produced for every mole of indoline product. The indolines may then be separated by first neutralizing the reaction mixture with about 1 liter of a saturated potassium carbonate solution, separating the oil layer and fractionally distilling the oil. This step allows the recovery of any excess primary or secondary aromatic amine which can be further converted to indoline. The undistilled product is sufficiently pure for most purposes but can be isolated in crystalline form by molecular distillation followed by crystallization of the viscous distillates from alcohol.

A useful variation in the above process involves the reaction of one mole proportion of α-chloroisobutyraldehyde being admixed with 1 mole proportion of a given primary or secondary aromatic amine and at least 3 mole proportions (preferably at least 5 mole proportions) of a given tertiary amine under the same conditions described above. The resultant reaction may be represented by the following equation wherein aniline, α-chloroisobutyraldehyde and N,N-dimethylaniline are used as representative reactants for the general reaction:

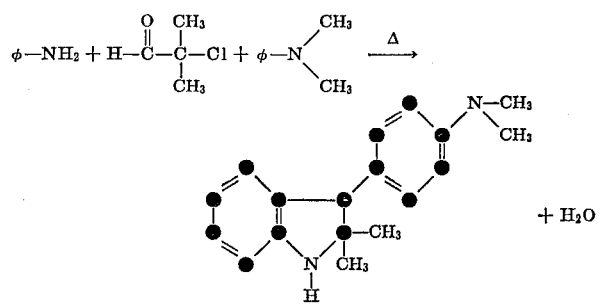

If desirable, for economic considerations the abovementioned processes may be conveniently carried out in an organic solvent such as xylene, toluene, etc.

The novel indoline compounds of this invention, unsubstituted in the 5-position, couple well with aromatic diazonium salts to provide a new class of azo dyes. Furthermore the indoline compounds of this invention which have a primary amino group on the 3-[(amino)phenyl] moiety may be diazotized and then coupled with aromatic couplers to provide another class of novel azo dyes. It has also been found that the novel indoline compounds of this invention can be converted to Fischer's bases when reacted with certain polyphosphate esters as described in copending application Ser. No. 264,690, filed June 20, 1972. These Fischer's bases may then be further reacted to form cyanine dyes. For example, Fischer's bases may be condensed with an aromatic aldehyde to form methine-type dyes, such as the Astrozones (*Organic Chemistry*, Third Edition, by Fieser, Reinhold Publishing Corporation).

The dyes formed from the indoline compounds of this invention may be reduced with, for example, aqueous sodium dithionite at 50° C. to give novel indoline photographic developers. Some of these compounds are found to be potent (high oxidation potential) developers of silver halides. The oxidized form of these developers couple efficiently with standard photographic couplers to give yellow, magenta and cyan image dyes.

The invention is further illustrated by the following specific examples.

EXAMPLE 1

Preparation of 2,2-Dimethyl-3-[p-(amino)phenyl]indoline

Five moles of aniline (446 g.) are degassed with nitrogen, stirred vigorously under a nitrogen atmosphere, and treated dropwise with freshly distilled α-chloroisobutyraldehyde over a 30-min. period. The exothermic reaction is controlled at 50° C. When the addition is completed the mixture is heated at the reflux temperature (about 130–135° C. due to the formation of one mole of water) under nitrogen for 3 hr., cooled, and neutralized with 0.50 mole sodium carbonate dissolved in 300 ml. water. The organic layer is separated and distilled directly. Vacuum distillation yields 3 moles of aniline and one mole of water. The viscous residue yields high assay 2,2-dimethyl-3-[p-(amino)phenyl]indoline. Part of the residue is rendered crystalline by molecular distillation (b.p. 190–230° at .06 mm. Hg). The product is crystallized in a receiver and is recrystallized from ethanol (m.p. 141.5–142°). The structure is as follows and is confirmed by infrared, nuclear magnetic resonance (NMR) and mass spectral analyses.

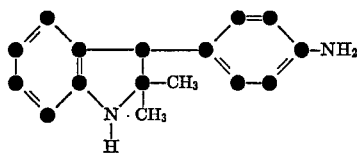

Yield 100% of theoretical, analysis calculated for $C_{16}H_{18}N_2$: C, 80.63; H, 7.61; N, 11.75. Found: C, 80.47; H, 7.68; N, 11.42.

EXAMPLE 2

The same procedure is followed as in Example 1 except as follows: N-methylaniline is used instead of aniline to produce 1,2,2-trimethyl-3-[p-(methylamino)phenyl]indoline having a melting point of 74–76° C. The structure is confirmed by NMR, infrared spectrophotometry and mass spectral analysis to be as follows:

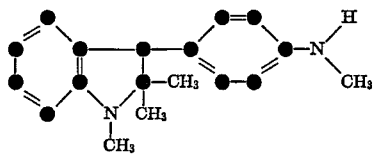

EXAMPLE 3

The same procedure is followed as in Example 1 except that the following reactants are utilized according to the following reaction.

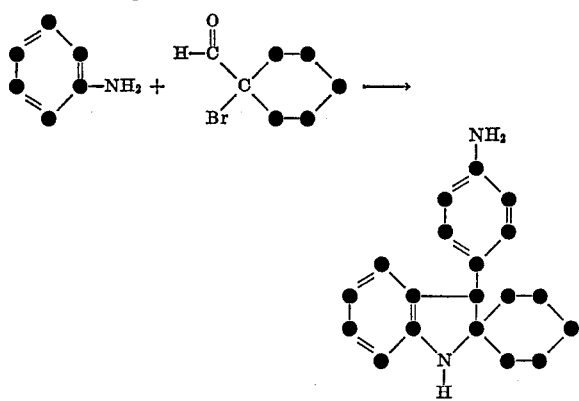

EXAMPLE 4

The same procedure is followed as in Example 1 except the following reactants are utilized according to the following reaction.

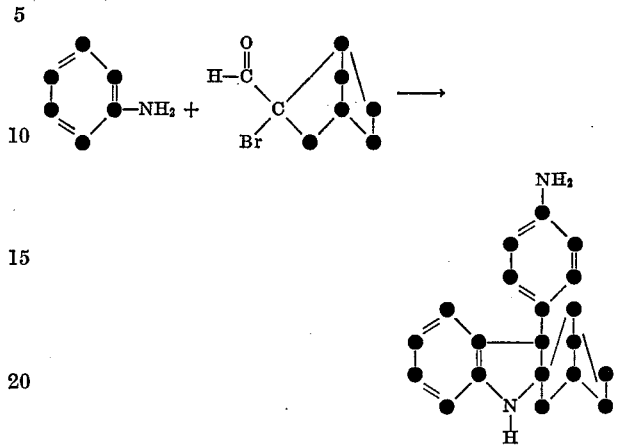

EXAMPLE 5

Preparation of N-methyl-2,2-dimethyl-3-[p-dimethylamino)phenylindoline.

A solution of one mole N-methylaniline, four moles N,N-dimethylaniline, and one mole α-chloroisobutyraldehyde is heated at the reflux temperature for 5.3 hr., cooled, and neutralized with 0.50 mole potassium carbonate dissolved in 500 ml. water. The organic phase is separated, washed with saturated sodium chloride, and passed through a layer of $MgSO_4$ on a Buchner funnel. Without further drying, the filtrate is directly vacuum distilled; removal of N,N-dimethylaniline leaves a residue which is nearly 100% product. Distillation of a part of the product across a short path (175° @ .06 mm.) gives distillate which crystallized on cooling. Two recrystallization from ethanol give an analytically pure product m.p. 133.5–135° which has the following structural formula:

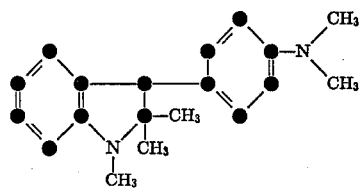

*Analysis.*—Calcd. for $C_{19}H_{24}N_2$: C, 81.38; H, 8.63; N, 9.99. Found: C, 81.32; H, 8.58; N, 9.97.

EXAMPLE 6

Preparation of α-Anilinoisobutyraldehyde.

A solution of 0.50 mole aniline and 0.50 mole triethylamine in 50 g. p-xylene is prepared, stirred vigorously under a nitrogen atmosphere, and treated with 0.50 mole α-chloroisobutyraldehyde. The clear solution is heated at heated at the reflux temperature for 3 hr., cooled, and stirred 18 hr. at room temperature. Filtration gives 50 moles triethylamine hydrochloride. Petroleum ether (200 ml.) is added to the filtrate which is chilled and induced to crystallize. Filtration gives 15 g. of α-anilinoisobutyraldehyde m.p. 87–91° (recrystallized from chloroform: petroleum ether).

EXAMPLE 7

Preparation of α-Chloroisobutyraldehyde Anil.

Aniline (0.25 mole) is cooled to 0° and treated with 0.25 mole α-chloroisobutyraldehyde; water rapidly separated and the equilibrium mixture is found to contain 60 mole percent of the α-chlorobutyraldehyde anil, water, and reactants.

The product is isolated in pure form by repeating the above reaction using, however, a $CCl_4$ solvent and adding anhydrous $MgSO_4$ to shift the equilibrium to completion.

Filtration gives a carbon tetrachloride solution of the pure anil.

EXAMPLE 8

Preparation of α-Anilinoisobutyraldehyde Anil.

A solution of 1 mole α-anilinoisobutyraldehyde and 1 mole aniline in 200 g. benzene is refluxed under a Dean-Stark trap until 1 mole of water is collected. Evaporation of the benzene gives an oil which is shown to be α-anilinoisobutyraldehyde anil.

EXAMPLES 9–11

The products of Examples 6, 7 and 8 are reacted with aniline under the conditions described in Example 1. In each case the viscous product is high assay 2,2-dimethyl-3-[p-(amino)phenyl] indoline.

EXAMPLES 12–15

The indoline compounds of this invention unsubstitued in the 5-position couple well with aromatic diazonium salts. The following dyes are prepared from the indolines of this invention according to well-known procedures and tested for their stability.

Although the invention has been described in considerable detail with particular reference to certain preferred embodiments thereof, variations and modifications may be effected within the spirit and scope of the invention.

I claim:
1. A compound of the formula

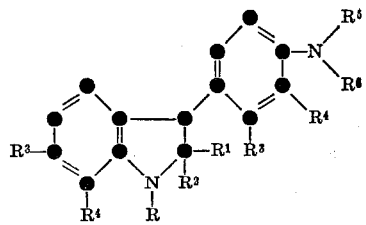

wherein
R represents hydrogen or lower alkyl;
$R^1$ and $R^2$ are the same or different and each represents lower alkyl or phenyl; or
$R^1$ and $R^2$ taken collectively with the carbon atom to which they are bonded represent a monocycloalkyl

| Dye | Stability on polyester fabrics | | | |
|---|---|---|---|---|
| | Light | Sublimation | Affinity | Color |
| Example 12: 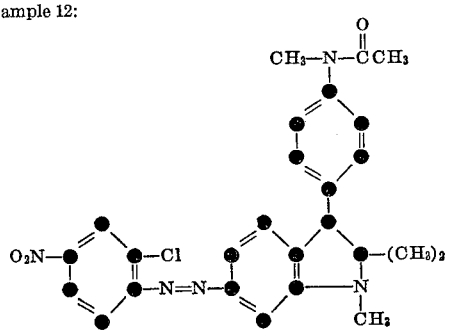 | Poor, good | Excellent | Good | Red. |
| Example 13: 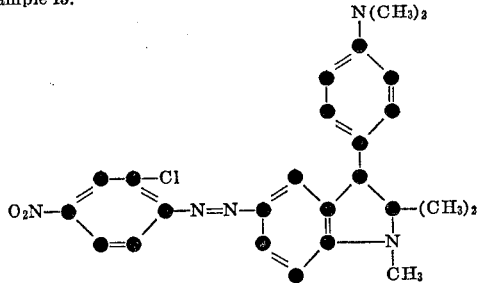 | Poor, Fair | Good | do | Red. |
| Example 14: 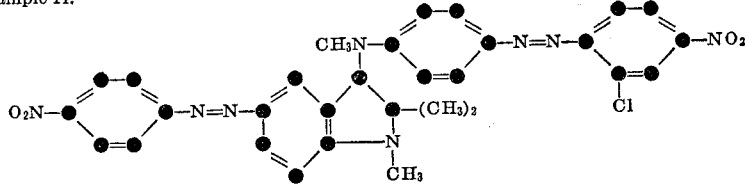 | do | Fair | do | Red. |
| Example 15: 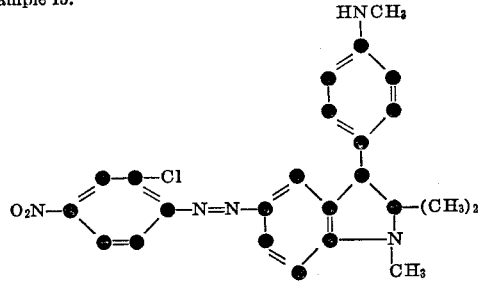 | do | do | do | Red. | ring of from 5 to 7 carbon atoms or a bicycloalkyl ring of from 7 to 9 carbon atoms;

$R^3$ and $R^4$ are the same or different and each represents hydrogen, lower alkyl, halogen or lower alkoxy; and $R^5$ and $R^6$ are the same or different and each represents hydrogen, lower alkyl, phenyl or lower alkyl substituted with cyano, halogen, lower alkoxy or hydroxy.

2. A compound of claim 1 wherein

R represents hydrogen, lower alkyl or phenyl;

$R^1$ and $R^2$ represent lower alkyl;

$R^3$ and $R^4$ represent hydrogen lower alkyl, halogen or lower alkoxy; and $R^5$ and $R^6$ represent hydrogen, lower alkyl, phenyl or alkyl substituted with cyano, halogen or lower alkoxy.

3. A compound of claim 2 wherein

R represents hydrogen or lower alkyl;

$R^3$ and $R^4$ represent hydrogen; and $R^5$ and $R^6$ represent hydrogen or lower alkyl.

4. A compound of claim 3 wherein

R represents hydrogen;

$R^1$ and $R^2$ represent methyl or ethyl; and $R^5$ and $R^6$ represent hydrogen, methyl or ethyl.

5. A method of preparing 3-[(amino)-phenyl]indolines which comprises the steps of:

admixing one mole proportion of a compound having the formula

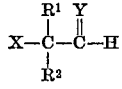

to (A) at least three mole proportions of at least one compound having the formula

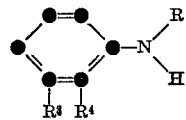

or (B) a mixture of at least one mole proportion of the above amine and at least three mole proportions of at least one tertiary amine having the formula

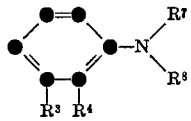

heating the admixture for at least 30 minutes at a temperature between about 110° and about 150° C.

wherein

R represents hydrogen or lower alkyl;

$R^1$ and $R^2$ are the same or different and each represents lower alkyl or phenyl; or $R^1$ and $R^2$ taken collectively with the carbon atom to which they are bonded represent a monocycloalkyl ring of from 5 to 7 carbon atoms or a bicycloalkyl ring of from 7 to 9 carbon atoms;

$R^3$ and $R^4$ are the same or different and each represents hydrogen, lower alkyl, halogen or lower alkoxy;

$R^7$ and $R^8$ are the same or different and each represents lower alkyl, phenyl, lower alkyl substituted with halogen, lower alkoxy or hydroxy;

X represents chloro, bromo or

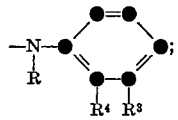

and

Y represents oxygen or

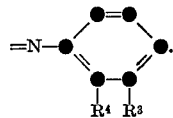

6. Method of claim 5 wherein the admixture is heated for at least one hour at a temperature of between about 130° and about 140° C.

7. Method of claim 5 wherein

R represents hydrogen or lower alkyl;

$R^1$ and $R^2$ represent lower alkyl;

$R^3$ and $R^4$ represent hydrogen, lower alkyl, halogen, or lower alkoxy;

$R^7$ and $R^8$ represent lower alkyl;

X represents chloro; and

Y represents oxygen.

8. Method of claim 5 wherein

R represents hydrogen, methyl or ethyl;

$R^1$ and $R^2$ represent methyl or ethyl;

$R^3$ and $R^4$ represent hydrogen; and $R^7$ and $R^8$ represent methyl or ethyl.

References Cited

UNITED STATES PATENTS 3,644,403   2/1972   Canas-Rodriguez __ 260—326.11

JOSEPH A. NARCAVAGE, Primary Examiner

U.S. Cl. X.R.

260—165